Patented June 28, 1938

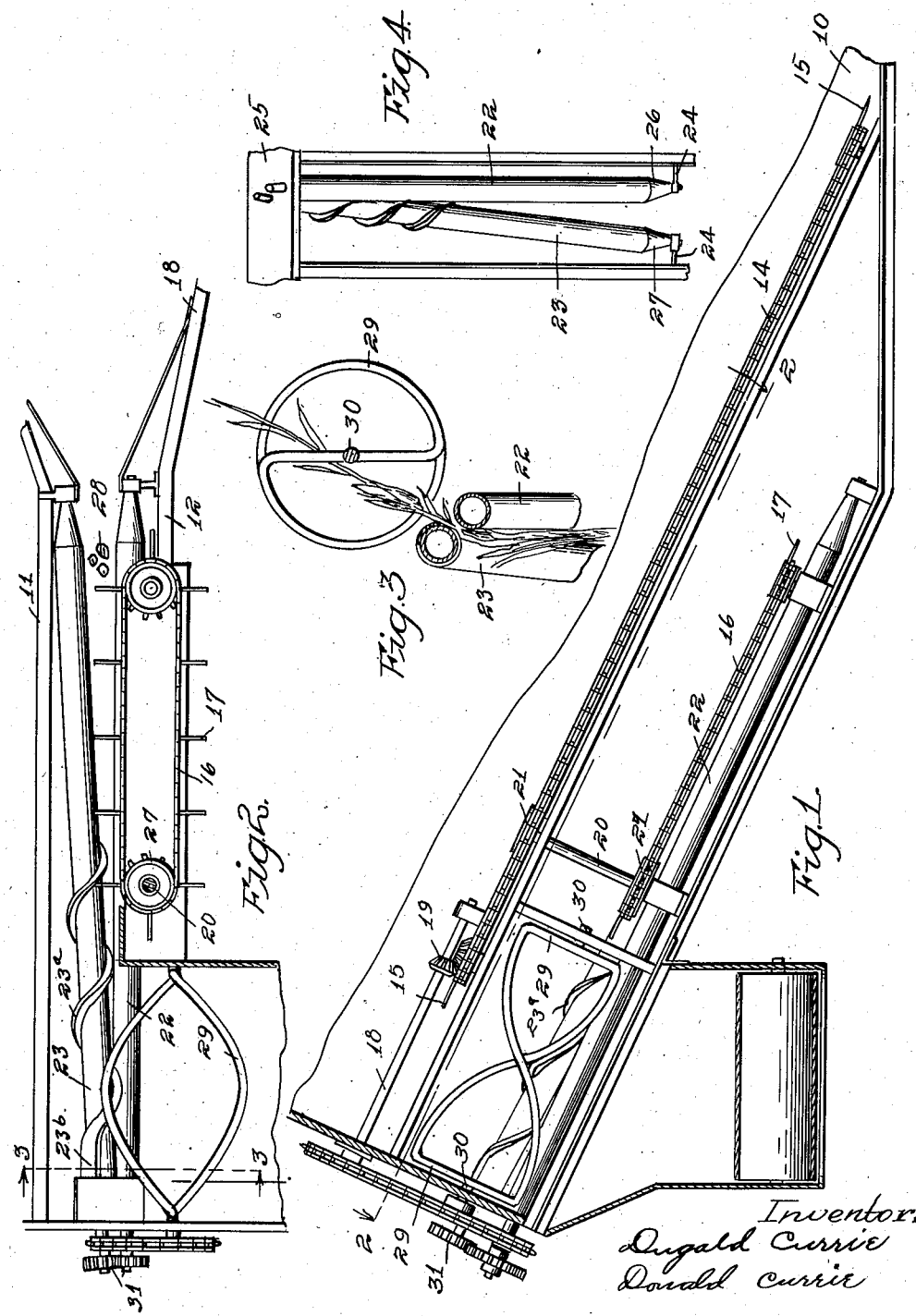

2,121,859

UNITED STATES PATENT OFFICE 2,121,859

CORN HARVESTER

Dugald Currie and Donald Currie, Odebolt, Iowa

Application December 9, 1936, Serial No. 114,911

2 Claims. (Cl. 56—107)

This invention relates to and is an improvement upon our prior patent Reissue No. 17,798, dated September 16, 1930. Our object is to provide a corn harvester of simple, durable and inexpensive construction.

More specifically, it is our object to provide a harvester of this class which may be operated with a minimum of applied power and which will secure from corn stalks substantially all of the ears, including the very small ears.

In the accompanying drawing Figure 1 shows a vertical longitudinal sectional view of a portion of a corn harvester having our improvement applied thereto;

Figure 2 shows a horizontal sectional view on the line 2—2 of Figure 1;

Figure 3 shows a detail sectional view on the line 3—3 of Figure 2, with a corn stalk having a small ear thereon, to illustrate the manner in which the rolls and spiral snapping bars co-operate to remove small ears; and Figure 4 shows a detail view of part of the harvester frame and illustrating the under side of the rolls.

That part of the machine frame shown is of the ordinary construction for corn harvesters and includes pick up arms 10 for engaging down corn stalks and directing them to the space between the frame members 11 and 12. At the rear is a conveyor frame 13 to receive the removed ears of corn and convey them to a point of discharge.

At the top of one of the frame members we have provided the usual corn stalk engaging chain 14 with fingers 15, and spaced below the chain 14 is a second corn stalk engaging chain 16 with fingers 17. These chains are driven by the shaft 18 and gearing mechanism 19 which drive the upper chain and the shaft 20 and sprockets 21 which drive the lower chain. These chains are advanced at about the same speed as the harvester is advanced, and perform the function of holding the corn stalks in substantially upright position and prevent them from tilting forwardly and rearwardly as they are being operated on by the harvester.

The snapping rolls are located directly beneath the lower chain 16. There are two rolls 22 and 23 rotatably mounted at their forward ends in the bearings 24 and at their rear ends in a part 25 of the frame. The roll 22 has a tapered front end at 25 and is of uniform diameter throughout its entire length. It is arranged substantially parallel with the line of advance of the harvester and is inclined upwardly and rearwardly.

The other roll 23 is tapered at its forward end at 27, and is of uniform diameter and smooth surfaced at its forward portion and at its rearward portion it is provided with a spiral rib 28. At the rear portion of this spiral rib 28 we have provided a transversely arranged lug 29 for purposes hereinafter made clear.

An essential feature of our present invention resides in the relative positioning of the roll 23 to the roll 22. As will be seen from the drawing, the rolls are spaced apart at their forward ends further than usual in harvesters of this class. In Figure 2 I have illustrated at 28 a group of three corn stalks, showing that the rolls are spaced apart far enough to freely admit the stalks of an ordinary "hill" of corn. At the rear, as shown in Figure 3, the rolls are so close together that even the tip of a small corn stalk cannot pass between the rolls without being engaged by both rolls. In addition to this it will be noted that the rearward end of the roll 23 is extended laterally and upwardly relative to the roll 22 to position partially overlapping the rearward portion of the rod 22, for purposes hereinafter made clear.

On the rearward half of the roll 23 I have formed a spiral rim 23a; at the rear end portion of this rib is a longitudinal lug 23b.

For snapping ears of corn from the stalks held by the rolls I have provided a snapping device which may be formed of a single metal rod. At each end there is a straight portion 29 formed with a bearing shaft 30. At each end of the straight part 29 a rod portion 31 is extended spirally to the opposite end of the other straight part 29. These spiral rods are so positioned that during their rotation they will move downwardly along one side of and close to a corn stalk held between the rolls, as illustrated in Figure 3. This snapping device is rotated by means of the gears 31 from the roll 22 and the sprocket gearing 31 operatively connects the roll 22 with the shaft 18. These gearing devices may be operated by power from a tractor wheel of the harvester or in any desired manner.

We have fully demonstrated in practical use in corn fields that with our improved harvester a maximum number of ears of corn will be removed from the stalks with a minimum of applied power.

As the harvester is being advanced over the field of corn planted in check rows, the stalks of a hill of corn all enter between the forward ends of the rolls in the form of a group of corn stalks. The rolls are widely separated to permit this and the space between the rolls gradually grows smaller as the rolls move forwardly relative to the stalks. At their forward end portions both rolls are smooth and unobstructed so that the group of stalks is slowly and easily separated until they stand in line longitudinally between the rolls. When the central portions of the rolls reach the stalks the space between the rolls is the same or less than the diameter of the individual stalks, hence the stalks are gripped by the rolls and moved downwardly between the rolls. During this operation an ear of corn on a stalk is brought to position with its butt engaging the rolls, and this is accomplished regardless of the angle at which the ear originally stood with relation to the stalk. As soon as this occurs the ear is rapidly moved to position inclined upwardly and outwardly from the stalk at the side adjacent the spiral snapping bars, which during their movement enter between the stalk and the tip of the ear of corn and move the ear downwardly and outwardly from the stalk and snap it from the stalk.

Our present invention is specifically designed to harvest the smaller ears of corn as well as the larger ones, and for that purpose we have caused the rearward ends of the rolls to come close together in overlapping positions. When a small ear is located near the top of a corn stalk or upon a small stalk or when in position on the side of a stalk opposite from the spiral snapping bars, then when passing between the rear ends of the rolls the stalks are bent laterally toward the spiral snapping bars and the small ears are subjected to the combined action of being struck by the spiral snapping bars and pinched off when the stalks are drawn down between the rolls which are so close together as to prevent the ears from passing between them.

We have also demonstrated in actual practice that with one roll smooth throughout its entire length, and the other smooth at its forward portion and provided with a spiral rib at its rearward portion, the harvester may be operated with a minimum of power and yet the spiral rib 23a will engage all corn stalks in such manner as to force them through the rolls and move the ears to proper position to be snapped by the spiral bars. The lugs 23b serve to break from a corn stalk any such small ear as might pass through the spiral groove formed by the spiral rib 23a.

We claim as our invention:

1. In a corn harvester, the combination of a pair of snapping rolls, both rolls being inclined upwardly and rearwardly, their forward ends being in substantially the same horizontal plane and being spaced apart far enough to freely admit between them all of the stalks of an ordinary "hill" of corn, one of said rolls being inclined relative to the other so that its rear end is substantially directly above the other roll and so close thereto that both rolls will engage a relatively small corn stalk, the forward portions of both rolls being smooth to thereby permit corn stalks, that enter between the rolls in positions in which the stalks between the rolls overlap each other, to readily and easily slide along the rolls to positions in which the stalks are parallel with each other between the rolls, the rear end of the roll which is uppermost being provided with an outwardly projecting spiral rib for gripping corn stalks and forcing them between the rolls, means for rotating the rolls in a direction for forcing corn stalks downwardly between them, snapping bars and means for rotating them in a path to enter between a corn stalk and an ear thereon when the ear is in position with its butt in engagement with the lower roll and move the ear downwardly and outwardly and snap it from the stalk held between the rolls.

2. In a corn harvester, the combination of a pair of snapping rolls, both rolls being inclined upwardly and rearwardly, their forward ends being in substantially the same horizontal plane and being spaced apart far enough to freely admit between them all of the stalks of an ordinary "hill" of corn, one of said rolls being inclined relative to the other so that its rear end is substantially directly above the other roll and so close thereto that both rolls will engage a relatively small corn stalk, the forward portions of both rolls being smooth to thereby permit corn stalks, that enter between the rolls in positions in which the stalks between the rolls overlap each other, to readily and easily slide along the rolls to positions in which the stalks are parallel with each other between the rolls, the rear end of the roll which is uppermost being provided with an outwardly projecting spiral rib for gripping corn stalks and forcing them between the rolls, means for rotating the rolls in a direction for forcing corn stalks downwardly between them, snapping bars, means for rotating them in a path to enter between a corn stalk and an ear thereon when the ear is in position with its butt in engagement with the lower roll and move the ear downwardly and outwardly and snap it from the stalk held between the rolls, and a lug at the rear of said spiral rib extended substantially parallel with the roll, for the purposes stated.

DUGALD CURRIE.
DONALD CURRIE.